United States Patent [19]

Raether

[11] Patent Number: 5,562,746
[45] Date of Patent: Oct. 8, 1996

[54] AIR FILTER ASSEMBLY FOR FILTERING AIR WITH PARTICULATE MATTER

[75] Inventor: Thomas D. Raether, St. Louis Park, Minn.

[73] Assignee: Donaldson Company, Inc., Minneapolis, Minn.

[21] Appl. No.: 534,323

[22] Filed: Sep. 27, 1995

Related U.S. Application Data

[63] Continuation of Ser. No. 225,883, Apr. 11, 1994, abandoned.

[51] Int. Cl.$^6$ .................................................. B01D 46/04
[52] U.S. Cl. ............................. 55/302; 55/341.1; 95/280
[58] Field of Search .............................. 95/280; 55/301, 55/302, 341.1, 341.2

[56] References Cited

U.S. PATENT DOCUMENTS

| | | | |
|---|---|---|---|
| 3,606,736 | 9/1971 | Leliaert | 55/302 |
| 3,683,595 | 8/1972 | Houghton et al. | 55/302 |
| 3,726,066 | 4/1973 | Colley et al. | 55/302 |
| 3,757,497 | 9/1973 | Ray | 55/302 |
| 3,798,878 | 3/1974 | Pausch | 55/302 |
| 3,877,899 | 4/1975 | Bundy et al. | 55/272 |
| 3,942,962 | 3/1976 | Duychinck | 55/302 |
| 3,963,467 | 6/1976 | Rolschav | 55/302 |
| 4,171,963 | 10/1979 | Schuler | 55/302 |
| 4,218,227 | 8/1980 | Frey | 55/302 |
| 4,278,454 | 7/1981 | Nemesi | 55/302 |
| 4,306,893 | 12/1981 | Fernando et al. | 55/302 |
| 4,319,897 | 3/1982 | Labadie | 55/302 |
| 4,345,922 | 8/1982 | Grassel | 55/302 |
| 4,395,269 | 7/1983 | Schuler | 55/302 |
| 4,409,009 | 10/1983 | Lissy | 55/302 |
| 4,445,915 | 5/1984 | Robinson | 55/302 |
| 4,468,240 | 8/1984 | Margraf | 55/302 |
| 4,666,472 | 5/1987 | Klimzcak et al. | 55/302 |
| 4,775,398 | 10/1988 | Howeth | 55/302 |
| 4,820,320 | 4/1989 | Cox | 55/302 |
| 4,955,996 | 9/1990 | Edwards et al. | 55/302 |
| 5,002,594 | 3/1991 | Merritt | 55/302 |
| 5,062,867 | 11/1991 | Klimzcak | 55/302 |
| 5,062,872 | 11/1991 | Williams | 55/302 |
| 5,062,873 | 11/1991 | Karlsson | 55/302 |
| 5,393,327 | 2/1995 | Chambers et al. | 95/280 |
| 5,421,845 | 6/1995 | Gregg et al. | 55/302 |

FOREIGN PATENT DOCUMENTS

| | | | |
|---|---|---|---|
| 0399249 | 11/1990 | European Pat. Off. | |
| 0452191 | 10/1991 | European Pat. Off. | 55/302 |
| 1284449 | 1/1962 | France | 55/302 |
| 2943093 | 5/1981 | Germany | 55/302 |
| 3412758 | 10/1985 | Germany | 55/302 |
| 2005777 | 4/1979 | United Kingdom . | |

OTHER PUBLICATIONS

Graphical presentation of "Effectiveness Values for Conical Diffusers." adapted from the data of A.T. McDonald and R.W. Fox: An Experimental Investigation of Incompressible Flow in Conical Diffusers, ASME Paper No. 65–FE–25, 1965.

Graphical presentation of "Coefficients of Pressure Recovery for Conical Diffusers" adapted from the data of A.T. McDonald and R.W. Fox: An Experimental Investigation of Incompressible Flow in Conical Diffusers, ASME Paper No. 65–FE–25, 1965.

*Primary Examiner*—Jay H. Woo
*Assistant Examiner*—Duane S. Smith
*Attorney, Agent, or Firm*—Merchant, Gould, Smith, Edell, Welter & Schmidt, P.A.

[57] ABSTRACT

An air filter assembly for filtering air with particulate matter therein is provided. The air filter assembly includes a housing having an air inlet and an air outlet, and a spacer wall separating the housing into a filtering chamber and a clean air chamber. The spacer wall includes a first air flow aperture therein. The assembly includes a filter element positioned in air flow communication with the first air flow aperture. The assembly also includes a Venturi element mounted in the spacer wall first air flow aperture. The Venturi element includes a bell-mouth-shaped end portion which projects into an inner clean air chamber of the first filter element. The assembly includes a pulse jet cleaning apparatus having a nozzle oriented to direct a pulse of air into the first Venturi element in a direction toward the first filter element.

21 Claims, 4 Drawing Sheets

AIR FILTER ASSEMBLY FOR FILTERING AIR WITH PARTICULATE MATTER

CROSS-REFERENCE TO RELATED APPLICATION

The present application is a continuation application of U.S. Ser. No. 08/225/883 filed Apr. 11, 1994 now abandoned.

FIELD OF THE INVENTION

The present invention is related to air filtering systems having Venturi elements and means for pulse-air-cleaning of filter elements.

BACKGROUND OF THE INVENTION

Particulate matter suspended in a gas is encountered in many industries. In some industries, such particulate matter is a valuable product, for example, starch, that is to be recovered. For others, such as the food industry, the particulate matter may be simply dust to be removed from the air. Systems for cleaning an air or gas stream laden with particulate matter include air filter assemblies that have filter elements disposed in a housing. The filter element may be a bag or sock of a suitable fabric or pleated paper. Cleaning is accomplished by periodically pulsing a brief jet of pressurized air into the interior of the filter element to reverse the air flow through the filter element. Such air filter assemblies are disclosed in, for example, U.S. Pat. No. 4,218,227 (Frey) and U.S. Pat. No. 4,395,269 (Schuler).

Venturi elements are sometimes used to direct the jet of pressurized air into the filter element and to recover pressure energy as air exits the filter element. Often, the inlet end of the Venturi element is either outside the filtering chamber or extends into the interior of the filter element. For example, U.S. Pat. No. 4,218,227 (Frey) discloses mounting a Venturi with the inlet of the Venturi element resting on the side of the partition of the filter chamber opposite the filter element. U.S. Pat. No. 3,942,962 (Duyckinck) discloses a Venturi element with the Venturi inlet portion extending into the interior of the filter element.

In a standard design of Venturi systems for application with pulse-jet cleaning, a high pressure drop (or pressure differential) occurs across the Venturi element. Pulse-jet cleaning systems generate loud noise as the back-pulse valves open and close to pulse the pressurized air necessary to overcome the pressure in the filter element for reversing the flow of air therein. The present invention is directed to an air filtration system that results in reduced noise level and lower energy loss during the filtration of particulate matter-laden air and pulse-jet cleaning of the filter elements.

SUMMARY OF THE INVENTION

The present invention provides an air filter assembly for filtering air with particulate matter. The air filter assembly comprises a housing that has a clean air chamber and a filtering chamber. The housing has an upper wall, a bottom, and a plurality of side walls, a clean air outlet, a dirty air inlet, means separating the clean air chamber from the filtering chamber, pulse-jet cleaning means, and a lowermost portion in the filtering chamber arranged and constructed for collecting particulate matter. The plurality of side walls depend from (i.e., are connected to) the upper wall and the dirty air inlet is positioned in the bottom or one of the walls. The means separating the clean air chamber from the filtering chamber includes means of mounting one or more filter elements within the filtering chamber. Each of the filter elements has an air-porous portion having proximal and distal ends and is in fluid communication with the air outlet. As used herein, a "proximal end" refers to an end that is proximal to the back-pulse valve for pulse-jet cleaning (or back-pulse cleaning) and a "distal end" refers to an end that is distal to the back-pulse valve. The pulse-jet cleaning means is used for cleaning each of the filter elements and is in a position intermediate (or between) the outlet and the filter elements. The separating means also includes a Venturi element mounted (or affixed) in the separating means. The Venturi element has a diffuser portion, a bell-mouth-shaped portion, and an arcuate throat portion interconnecting the diffuser portion and the bell-mouth-shaped portion (or Venturi inlet portion). The Venturi element is positioned such that the bell-mouth-shaped portion is disposed in the filtering chamber and the diffuser portion extends into the clean air chamber. The Venturi inlet portion can have a distal end that is proximate to and in crosswise alignment with the proximal end of the air-porous part of the filter element such that air flowing through the air-porous proximal end to the Venturi inlet portion distal end travels in a generally straight path and is unobstructed between the filter element and the Venturi element.

The air filter assembly according to the present invention also can have a Venturi element wherein the radius of the throat of the Venturi is selected to result in a filtration air flow velocity through the throat at less than half the velocity in standard Venturi elements used in pulse-jet cleaning means. As used herein, all radii and diameters referring to radii or diameters of Venturi throats, diffuser outlets and inlets of bell-mouthed portions are inside dimensions unless otherwise specified.

The air filter assembly according to the present invention can also have a Venturi element whose ratio of diffuser outlet radius to throat radius is selected to be less than those in standard Venturi elements designed for efficient pressure recovery in air filter assemblies with pulse-jet cleaning means. The ratio of the diffuser length to throat radius of the Venturi element in the air filter assembly of the present invention can also be selected to be less than those in standard Venturi elements designed for efficient pressure recovery in air filter assemblies with pulse-jet cleaning means.

Compared to conventional air filter assemblies with Venturi elements, the air filter assembly of the present invention can have reduced air velocity in the clean air chamber, thereby lowering pressure loss therein. The velocity of air passing through the Venturi throat can also be reduced. The pressure between the filtering chamber and clean air chamber can also be lower than in conventional designs. Because of said lower air velocities and said lower pressure differential in the operation of the air filter assembly, less energy is required to drive air through the assembly. Further, the lowering of air flow velocity through the Venturi throat significantly reduces noise during the pulse-jet cleaning of filter elements because less pressurized air is needed and smaller back-pulse valve can be used. The volume of the air assembly are can also be smaller than standard designs due to the shorter length of the truncated diffuser. Lower pressure differential between the filter chamber and the clean air chamber can result in lower installation and operating cost due to the smaller blower fan and back-pulse valves required.

BRIEF DESCRIPTION OF THE DRAWINGS

FIG. 3 is a front elevation view of the present invention with portions broken away.

FIG. 4 is a perspective view of a portion of the present invention.

DETAILED DESCRIPTION OF THE PREFERRED EMBODIMENT

Figure 1:
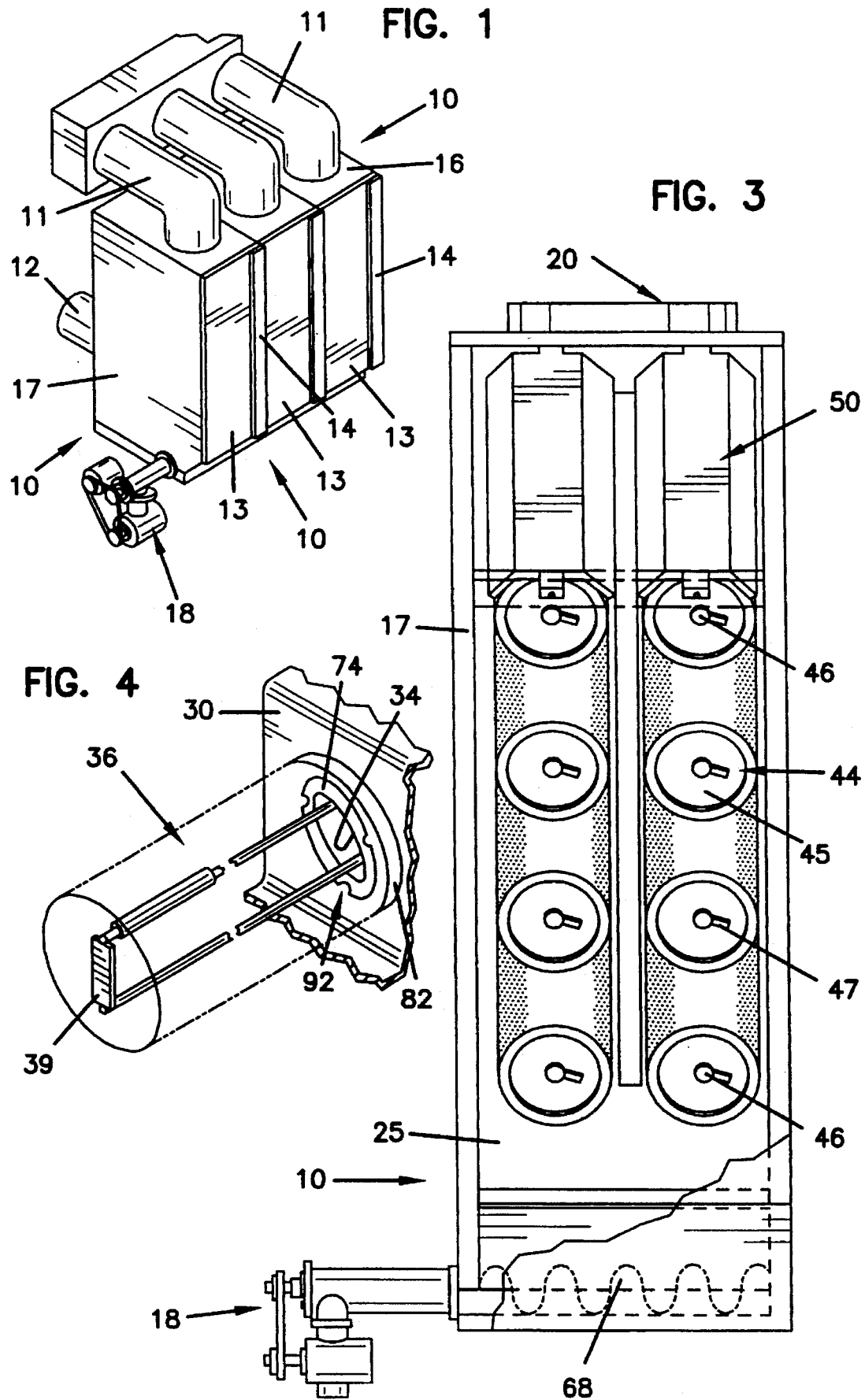
FIG. 1 is a perspective view of one type of operational installation for the present invention.
Figure 2:
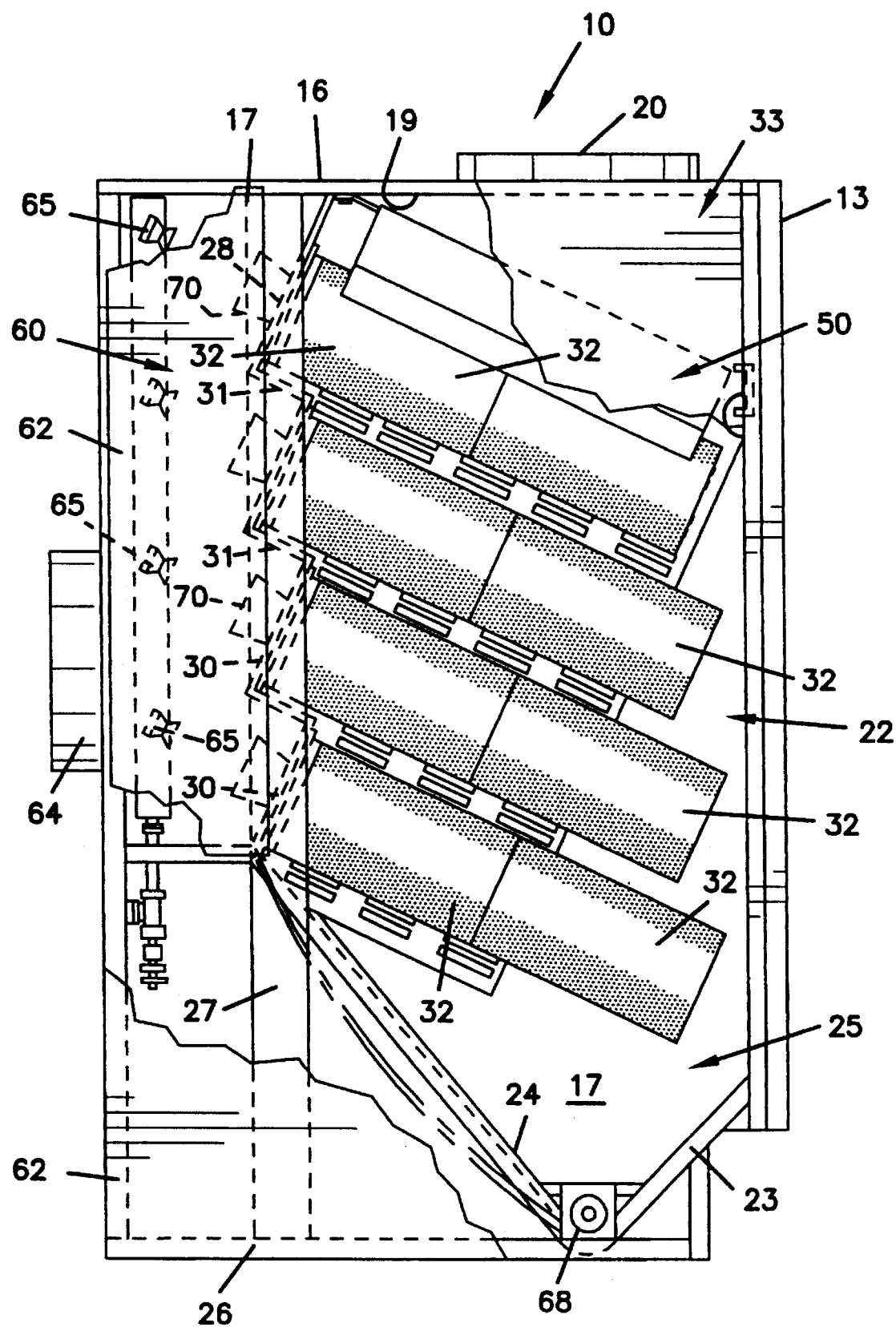
FIG. 2 is a side elevation view of the present invention with portions broken away.

The present invention provides an air filter assembly that has a Venturi system which causes low energy loss. In the drawings, wherein like reference numerals represent corresponding parts in the several views, FIGS. 1–3 show a preferred embodiment of such a system. Except for the Venturi system and the lower pressure differential between the filtering chamber and the clean air chamber, the configuration, construction, and operation of the filter assembly are substantially similar to those of U.S. Pat. No. 4,395,269, which disclosure on the configuration, construction, and operation are incorporated by reference herein. Referring to FIG. 1, three units or modules 10 of the present invention can be configured together as shown in side-by-side arrangement. This arrangement can be, for example, of a size that fit into a 6 feet by 10 feet by 10 feet space.

Each module in FIG. 1 includes a conduit 11 for venting dirty or contaminated air (i.e. with particulate matter) into the filter assembly. A like conduit 12 is provided for venting clean or filtered air from the filter assembly. A front access door 13 and a secondary access door 14 are also provided to permit access to the interior of the module for purpose of, for example, maintenance.

Also shown in FIG. 1 is a motor and chain drive assembly 18 of standard construction for operation of an auger screw in the base portion of the assembly.

Referring now to FIG. 2, the present invention is shown in side elevation with one side wall panel 17 being broken away to illustrate the arrangement of the various elements of the assembly. The upper wall panel 16 has an inner wall surface 19. In this embodiment, the air inlet is positioned in the upper wall panel so that entering dust-laden air or other contaminated fluid is introduced in a downwardly direction into the dirty air chamber 22. This allows the assembly to utilize the forces of gravity in moving the dust through the assembly 10 to the collection area. The dirty air chamber 22 is defined by the door 13, the upper wall panel 16, two pairs of opposing side wall panels 17 which extend downwardly from the upper panel, stepped wall structure 28, and a pair of sloping surfaces 23,24. The sloping surfaces 23,24 partially define a collection area or hopper 25 within the base portion of the assembly. A bottom base panel or frame 26 is sealed to the side wall panels 17 in any suitable, standard manner. Also, the dirty air chamber 22 is a sealed chamber in order to prevent any escape of contaminated air or fluid prior to its being filtered.

Sealed to a structural frame member 27 along each of the side wall panels 17 is mounted tube sheet structure 28 having a step-like design to which are mounted the separate filter elements 32 of the assembly. The tube sheet structure 28 is sealed on all four sides to hermetically seal the dirty air chamber 22 from a clean air chamber 60. The structure 28 in the preferred embodiment has three steps or indented portions. Each step portion includes an upwardly extending back member 30 and a leg member 31 extending at right angles therefrom. The tube sheet structure 28 is preferably constructed from a single piece of sheet steel and thus the individual step portions are continuous extensions of the step portion immediately above it and below it. As shown in FIGS. 2 and 3, the filter elements 32 mounted to the stepped, tube sheet structure 28 are positioned in the dirty air chamber 22 in stepped or spaced apart, partially overlapping relationship, in a generally downward direction at an acute angle of inclination with respect to the horizontal plane of the upper surface panel 16. In this manner, a distribution space 33 is defined in the uppermost portion of the filter assembly 10 by the inclined baffle 50, the side wall panels 17, the upper wall panel inner surface 19, and front access door 13. As the dirty air enters the assembly 10 from the inlet 20, it is received into the distribution space 33 prior to its being filtered.

The individual filter elements 32 are pleat media formed into cylindrical tube elements each having ends. The construction of the filter media portion of each element and how it is supported to the tube sheet structure 28 is similar to the filter element of U.S. Pat. No. 4,395,269 except for differences described herein. Details of construction of the filter element and how the filter media is fashioned into stable cylindrical shape and confined with end caps as disclosed in U.S. Pat. No. 4,171,963 (Schuler) are incorporated by reference herein. The support assembly for supporting the filter element is shown in FIG. 4. A portion of a back member portion 30 of the tube sheet structure 28 has an opening (not shown in FIG. 4, but shown in FIG. 7) through which is disposed the venturi element 70. A yoke assembly 36 is used for supporting the filter element 32. The yoke assembly can have steel rods extending through the interior of the Venturi element 70 and welded to the tube sheet structure 28 on the side (not shown) in the clean air chamber. Alternatively, although not shown in the figures, steel rods of the yoke assembly can be threaded at the proximal end and extend through the notches 92 in the Venturi bell-mouthed-portion and the apertures 89 in the flange 88 of the Venturi element 70 described below. In such a case, a rod can be structured so that it can be secured to the tube sheet structure 28 together with the flange 88 of the Venturi element 70 by a nut placed on the clean air chamber side of the tube sheet structure. This can be achieved by various means apparent to one skilled in the art. For example, the rod can have an integral annular ridge proximate its proximal end to act a stop as the proximal end of the rod is extended through an aperture 87 of the tube sheet structure 28 to be fastened with a nut. This arrangement has the advantage that no rod extends through the throat of the Venturi element 70. Another practicable alternative for securing the filter element to the tube sheet structure 28 is one similar to the arrangement disclosed in U.S. Pat. No. 4,218,227 (Frey).

The media of the cylindrical tube element in the filter element 32 is confined in end caps (or collar member) at both ends. Generally, the portion of the media covered by the end caps are not considered porous to air as it is shielded by the end cap. The proximal end cap 82 rests on a gasket 84 disposed between the proximal end cap and the tube sheet structure 28. By pressing the filter element 32 toward the tube sheet structure 28 and compressing the gasket 84, the proximal end cap 82 is sealed to the tube sheet structure to prevent air leakage.

Each yoke assembly is secured perpendicularly to the tube sheet structure so as to suspend the filter elements at an acute angle with respect to the horizontal. The preferred range for the angle of inclination of the filter elements is from 15°–30° from the horizontal. Each yoke assembly 36 in the invention is constructed similarly. In the embodiment shown, two parallel vertical rows of two filter elements each are provided. Each step portion of the tube sheet structure thus has two spaced apart yoke assemblies mounted to its back member 30.

FIGS. 2 and 3 taken in combination illustrate the placement of a pair of filter elements 32 onto each yoke assembly 36. An annular distal end cap 44 having a dish portion 45 and a centrally located opening is aligned with the end plate 39 so as to sealingly cover the outboard end of the second filter element of each pair. This allows the removable attachment of a clamping means for axially compressing the gaskets (not shown in FIGS. 2–3) of the filter elements 32 to seal them to the tube sheet structure 28 as well as to each other. The end cap dish portion 45 helps strengthen the end plate so that less of the cleaning pulse energy is dissipated in the metal. Also, the fastening bolt 46 with its special handle 47 is inserted through the aligned apertures of the end plate 39 and end cap 44 to secure the two together.

Directly behind the tube sheet structure 28 is located the clean air chamber 60 which is defined by the back surface panel 62 of the assembly and a portion of the upper surface panel 16, a portion of the two opposing side panels 17, and the back side of the tube sheet structure 28. Mounted in the back surface panel 62 in fluid communication with the clean air chamber 60 is a clean air outlet 64 for venting the clean, filtered air into the conduit 12 for return to the plant environment. Means for cleaning each yoke assembly and the filter elements is also provided in the clean air chamber 60. The means includes a plurality of pulse type valves and nozzles 65. A valve and nozzle arrangement is positioned directly in line with an outlet opening 34 in the tube sheet structure 28 so as to direct a jet of compressed air into the hollow interior of a pair of filter elements 32. The type of pulse type valves (or back pulse valves), nozzles, piping arrangement to provide pressurized air, and their control and operation are known in the art.

Figure 5:
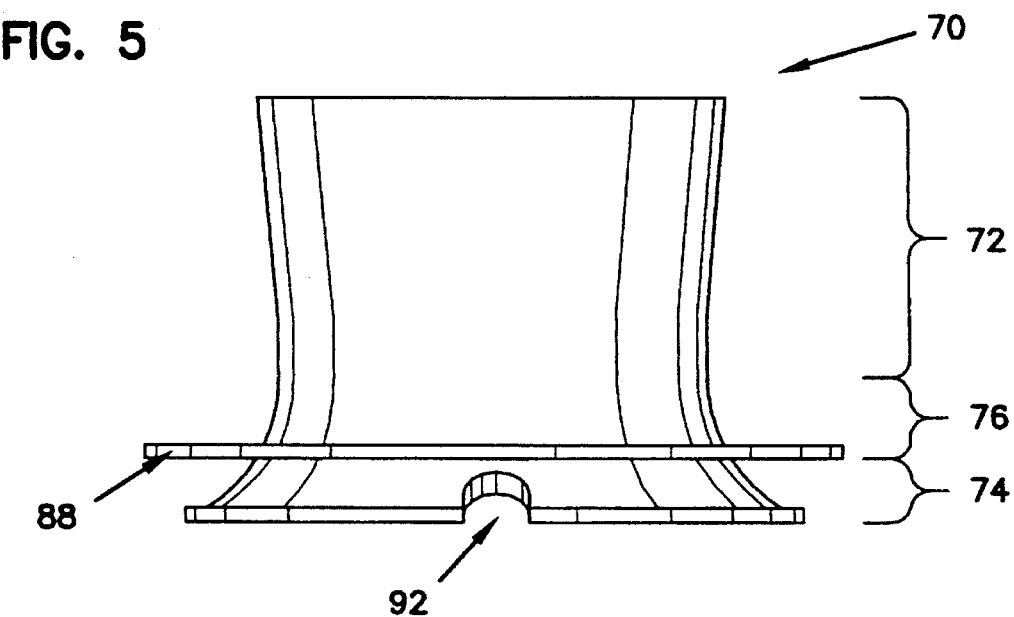
FIG. 5 is a side view of an embodiment of the Venturi element of the present invention.
Figure 6:
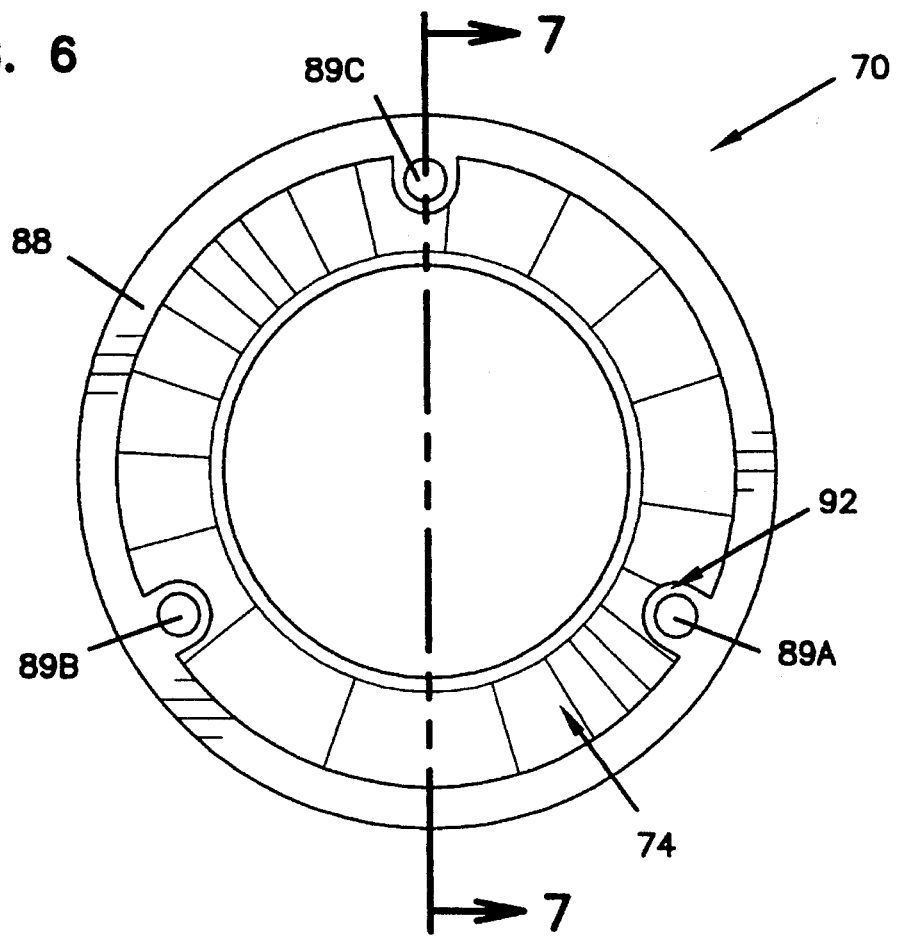
FIG. 6 is an end view of the Venturi element shown in FIG. 5 viewed from the distal end thereof.
Figure 7:
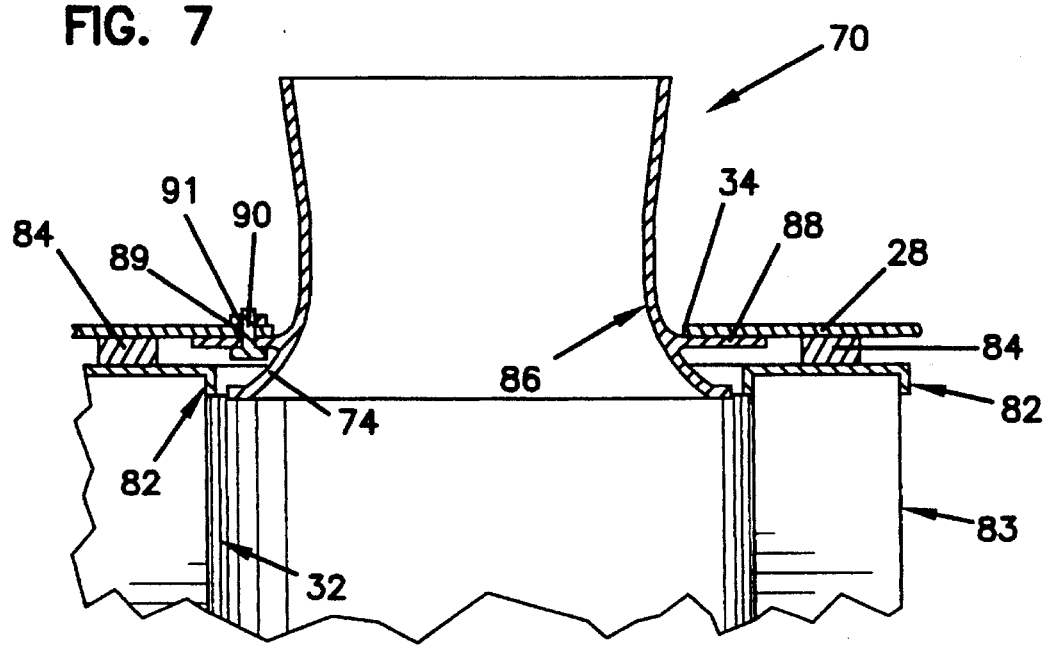
FIG. 7 is a partial cross-sectional view of an embodiment of a Venturi system of the present invention having a Venturi element shown in FIG. 6, showing the cross-sectional view of the Venturi element taken along the line 7—7.

Referring to FIGS. 5–7, mounted on the tube sheet structure 28 are Venturi elements 70. Each Venturi element includes a diffuser portion (or Venturi outlet portion) 72, an inlet bell-mouth-shaped portion (or Venturi inlet portion) 74, and an arcuate throat portion 76 that interposes between and interconnects the diffuser portion 72 and the Venturi inlet portion. Air exits the Venturi element 70 through the diffuser into the clean air chamber when air is filtered and passes through the filter element 32 from the filtering chamber in a normal filtration air flow pattern. The diffuser portion 72 preferably has diverging (or flaring), essentially straight walls to direct pulsed air into the Venturi element 70 during pulse-jet cleaning to facilitate pressure recovery and for ease of construction. The throat portion 76 is concave in the direction toward the interior thereof.

The Venturi element 70 is positioned on the tube sheet structure 28 in relation to the filter element 32 such that the Venturi inlet portion 74 is disposed in the filtering chamber (or dirty air chamber) 22 and the diffuser portion 72 extends into the clean air chamber 60. As shown in FIG. 7, the Venturi inlet portion 74 has a distal end that is proximate to and is aligned such that it is generally at the same crosswise level with the most proximal point of the filter element 32 that is porous to air (i.e., not covered by the proximal end cap (or collar member) 82. In this way, air that passes through the proximal part of the air-porous portion 83 of the filter element 32 travels to the Venturi element 70 along a generally straight path and is unobstructed between the filter element 32 and the Venturi element. Such unobstructed movement of air along a generally straight path reduces resistance to air flow and energy loss. In the design of the Venturi element, it is important that the compression of the gasket 84 for sealing the filter element 32 to the tube sheet structure 28 and the consequent proximal or distal displacement of the proximal end cap 82 be taken into consideration.

Generally, the distance from the tube sheet structure 28 to the proximal part of the air-porous portion 83 is an important factor affecting the design of the Venturi element. As long as the Venturi inlet is aligned crosswise with the most proximal point of the filter element 32 that is porous to air, the exact location of the throat portion 76 can vary slightly. For example, the throat 86 of the throat portion may be on either side of the tube sheet structure 28. Although it can be done otherwise, generally, most or all of the diffuser portion 72 is disposed on the clean air chamber side of the tube sheet structure 28.

To reduce the energy required to move the air and to further reduce the resistance to air flow, preferably the throat 86 (i.e., the part of the throat portion 76 that has the smallest radius) has a radius selected to result in a filtration air flow velocity of lower than the standard Venturi elements 70 designed for efficient pressure recovery in application in air filtration assemblies with pulse-jet cleaning means. In other words, the throat radius is larger than it is in standard designs. Preferably, the throat radius is selected to be as large as possible in relationship to the inside radius of the filter element end cap (or collar member) 82. In this way, air passing through the throat is not required to accelerate significantly, thereby reducing the pressure differential across the Venturi inlet and outlet and lowering the energy loss. Lowering the pressure differential across the Venturi also reduces the amount of pressurized air and therefore the size of the back-pulse valve necessary for pulse-jet-cleaning of the filter element 32. This can reduce the noise generate in pulse-jet cleaning. The throat radius can be, for example, selected to effect a air flow velocity through the throat (at normal air flow rate to media area ratio of about 2:1 to about 4:1 cu ft per min per square ft) at less than half the velocity in standard designs, preferably at less than 4000 ft/min, more preferably at about 1000 to about 2500 ft/min.

The resistance to air flow can further be reduced by truncating (or reducing) the length of the diffuser portion 72 of the Venturi element. Long diffusers extending into the clean air chamber reduce the volume therein for air movement and therefore increase the velocity of air flow for any specific volumetric flow rate. Furthermore, long diffusers cause resistance to air travelling from a Venturi element to the clean air outlet 64 because of air impinging on the diffuser portions 72 of other Venturi elements. Truncating the length of the diffuser thus reduces the velocity of air and reduces resistance, thereby resulting in less energy loss in the clean air chamber. In the present invention, the relative dimensions of the diffuser length, the throat radius, and the radius of the Venturi diffuser outlet is designed such the diffuser length is less than in standard Venturi elements for pulse-jet-cleaned filter assemblies, preferably less than half that of such standard Venturi design. As a consequence, the diffuser length to throat radius is also less than that found in the standard Venturi elements. An example of information relating to designing standard Venturi systems is disclosed by A. T. McDonald and R. W. Fox, "An Experimental investigation of Incompressible Flow in Conical Diffusers," ASME Paper No. 65-FE-25, 1965, which method of designing is incorporated by reference herein. Preferably, in the present invention, the ratio of diffuser length to throat radius is about 1:1 to about 2.0:1, more preferably about 1.1:1 to 1.2:1. For example, a Venturi of such a design can have a ratio of diffuser outlet radius to throat radius of about 1.02:1 to 1.3:1.

In the preferred case wherein the throat radius is increased, in order to avoid using long diffusers, the ratio of diffuser outlet radius to throat radius is selected to be less than in standard Venturi elements designed for efficient pressure recovery used in pulse-jet-cleaned filter assemblies. This ratio of the Venturi element in the present invention can be about 1.02:1 to 1.3:1, preferably about 1.05:1 to about 1.2:1. Such a ratio will reduce the resistance to air flow so that energy consumption is lowered and yet efficient particulate removal and media-cleaning by back-pulsing is maintained.

By reducing air flow resistance through Applicant's judicious selection of the throat radius of Venturi element and the ratio of diffuser length to throat radius, Applicant has found that, with an air flow velocity through the throat at less than half the velocity of standard designs, efficient particulate removal and media-cleaning can be maintained at a pressure differential across the Venturi element of less than 1 inch of water, for example, 0.2 inch of water at normal air flow rate to media area ratios (e.g., about 2:1 to about 4:1 cu ft per min per square ft).

Referring to FIGS. 5–7, the Venturi element 70 has means for mounting on the tube sheet structure 28. The means for mounting can be, for example, a tab (not shown) or a flange 88 extending outwardly in a plane substantially perpendicular to the axis of the Venturi element proximate the throat portion 76 on the exterior surface thereof. The flange 88 can be intermediate the distal end of the inlet portion 74 and the Venturi diffuser portion 72. The flange 88 can have apertures 89 (e.g. three as shown in FIG. 6, 89A, 89B, 89C) for receiving means such as a bolt 90 to pass therethrough for fastening to the tube sheet structure 28 in corporation with a nut 91. Generally, the outside diameter of the flange 88 is larger than that of the distal end of the inlet portion 74 of the Venturi element 70 and the diameter of the opening 34 in the tube sheet structure 28 to provide secure attachment to the tube sheet structure.

To provide ease of access to the aperture 89 in the flange 88 so that a bolt, a similar fastening means, or a rod (for example, the rod of a yoke assembly for supporting a filter element) can be inserted therethrough for fastening the Venturi element 70 onto the tube sheet structure 28, notches 92 can be provided on the inlet portion 74 of the Venturi element, each proximate one of the apertures 89. The outside diameter of the diffuser is smaller than the diameter of the opening 34 in the tube sheet structure 28 so that the diffuser portion 72 of the Venturi element 70 can be inserted through that opening for mounting the Venturi element onto the tube sheet structure with the diffuser extending into the clean air chamber and the inlet portion 74 disposed in the filtering element.

Referring to FIG. 2, the air filter assembly has a bottommost portion 25 in the dirty air chamber 22 that is substantially similar to that disclosed in U.S. Pat. No. 4,395,269. Such a bottommost portion 25 has two sloping surfaces 23, 24, one of which can act as a diaphragm to movably response to the pressure differentials created within the dirty air chamber by the operation of the pulse-jet cleaning means. An auger screw 68 is present at the intersection of the two sloping surfaces extending fully through the lowermost portion 25 of the dirty air chamber 22 for removal of particulate matter collected in the dirty air chamber 22 to a location exterior to the air filter assembly.

Although the embodiment with an inclining arrangement of filtering elements and a sloping diaphragm-like surface that moves in response to pressure differentials caused by pulse-jet cleaning is disclosed, the Venturi system of the present invention can be applied to air filter assemblies with, for example, a vertical filter element, a particulate collection system without a diaphragm-like surface, or a system without auger.

OPERATION OF THE INVENTION

Air or other particle laden gaseous fluid can be driven into the dirty air chamber 22, through the air inlet 20 and the filtering elements 32, and from the clean air chamber 60 to the outlet 64 of the filter assembly in the preferred embodiment of the present invention in a manner substantially similar to that described in U.S. Pat. No. 4,395,269, which description of operation has been incorporated by reference.

Figure 8:
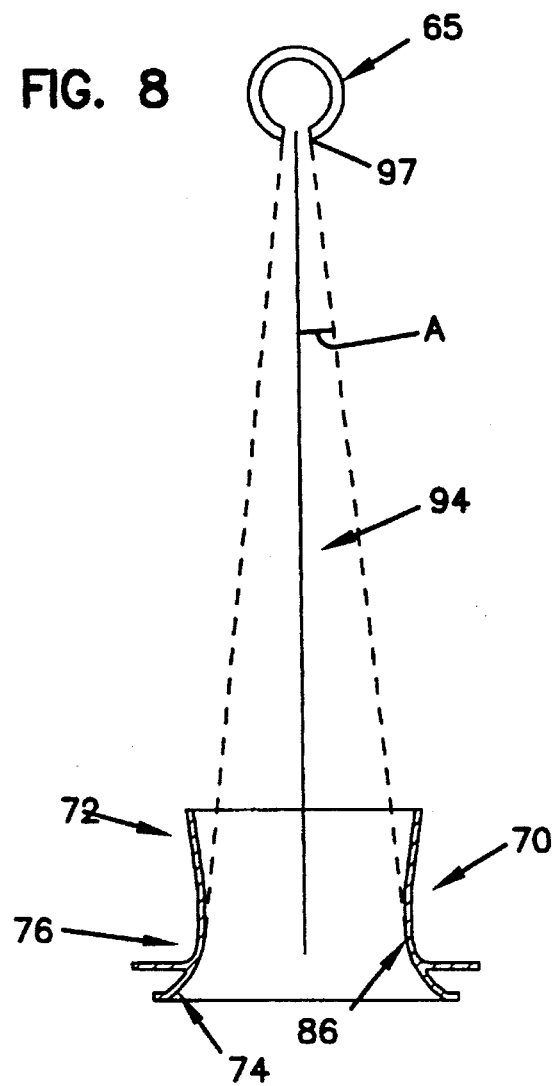
FIG. 8 is a plan view of the pulse-jet-cleaning means and the Venturi element.

After a predetermined interval of filtering, the filter elements 32 will become coated with dust and other particulate matter and must be cleaned. Each of the filter elements 32 are pulse-jet-cleaned by its respective quick-acting valve (i.e. back-pulse valve) and nozzle 65 which discharges a quantity of pressurized air from the nozzle toward and into the diffuser portion 72 of the Venturi element 70. As shown in FIG. 8, preferably the angle of divergence, A, of the air jet 94 from the nozzle 65 is selected so that the air jet is focused into the interior of the diffuser portion 72, more preferably proximate the throat to facilitate the aspiration of secondary air (i.e., air from the clean air chamber) into the filter element 32. In the embodiment shown in FIG. 8, the throat diameter is 4.25 inches, the nozzle 65 has a outlet aperture 97 of 0.5625 inch, the angle of divergence of the air jet is 7.5°, the axial distance from the throat to the distal end of the Venturi inlet portion 74 is 3.3 inch, and the distance from the throat to the outlet aperture 97 of the corresponding nozzle 65 of the pulse-jet-cleaning means is 14.05 inch. Such an arrangement is effective for pulse-jet cleaning the filter elements. Generally, the pressure of the pressurized air effective for pulse-jet cleaning can be similar to that used in conventional systems with standard Venturi element. However, as previously stated, smaller back-pulse valves can be used in the air filter assemblies of the present invention.

The uppermost filter elements are cleaned first with cleaning of the remaining elements occurring from top to bottom in the assembly. Dust blown off of the upper filter elements is carried downward by gravitational settling and fluid dynamic transport from one set of filter elements onto and past the next lower set of filter elements.

During the operation of the pulse-jet cleaning means the larger, sloping surface or diaphragm 24 moves outward or away from the filter elements 32 in response to the increase in pressure within the dirty air chamber 22. This outward flexing is shown in broken lines in FIG. 2. As the pressure diminishes, the surface 24 flexes back to its normal position. As the particulate matter accumulates in the lowermost portion 25 upon the auger screw 68, it is removed, by the operation of the auger screw 68, to a location exterior the filter assembly. There is nearly zero dirty air velocity at the point adjacent to the auger screw, as a result of the dirty air inlet not being in nor even adjacent to the particulate matter collection area of the filter assembly.

As previously stated, the air filter assembly of the present invention is operated with a pressure differential between the filtering chamber and the clean air chamber less than that in standard air filtration system with pulse-jet-cleaning designs. Preferably, the present invention is operated such that the pressure differential across the Venturi element is less than 1 inch of water, more preferably less than 0.5 inch of water, even more preferably about 0.2 to 0.4 inch of water at normal air flow rate to media area ratios. The following table shows examples of the pressure differential across an Venturi element, at various air flow rate through the filter element in an embodiment shown in FIGS. 1–5, with a throat radius of 1.781 inch, a diffuser with straight wall diverging at an angle of 7.5° from the axis of the diffuser, and the bell-mouth-shaped portion having a curvature of 1.125 inch radius. The ratio of air flow rate to media area (in cu.ft of air per min per sq ft of media) is also shown. In this arrangement, the distal end of the inlet portion 74 of the Venturi element 70 is proximate and aligned crosswise with the proximal end of the air-porous portion of the filter element. Operating the preferred embodiment to filter air laden with particulate matter results in less energy use per unit volume of air filtered compared to conventional systems with standard Venturi designs.

| Air Flow Rate Ratio Cu.ft/min ft³/ft²min | Air Velocity At Throat ft/min | Pressure Drop inch Water |
| --- | --- | --- |
| 144 2:1 | 2080 | 0.27 |
| 180 2.5:1 | 2600 | 0.42 |
| 216 3.0:1 | 3120 | 0.61 |
| 252 3.5:1 | 3641 | 0.83 |

The preferred embodiment of the present invention relating to the application of a low-air-velocity Venturi system to a compact dust filter assembly has been described in the foregoing description and drawings. However, the Venturi system can also be adapted to be applied in other gas filtration systems, for example, the dust collector disclosed in U.S. Pat. No. 4,218,227 (Frey) and the air filter assembly disclosed in U.S. Pat. No. 4,319,897 (Labadie). It is understood that the disclosure of the preferred embodiment is for illustrative purpose only and that modifications in details can be made by one skilled in the art without departing from the spirit and scope of the invention, especially in matters of shape, size, and arrange of certain parts.

What is claimed is:

1. An air filter assembly for filtering air with particulate matter therein; said air filter assembly comprising:
   (a) a housing including an air inlet and an air outlet; said housing including a rigid spacer wall separating said housing into a filtering chamber and a clean air chamber; said spacer wall including a first air flow aperture therein;
   (b) a first filter element positioned in air flow communication with said first air flow aperture in said spacer wall; said filter element including filter media defining a filter element inner clean air chamber;
   (i) said first filter element being oriented with said filter inner clean air chamber in air flow communication with said spacer wall first air flow aperture;
   (ii) said first filter element including a first end cap having a central aperture; said filter media being embedded within said first end cap;
   (c) a first Venturi element mounted in said spacer wall first air flow aperture; said first Venturi element having a diffuser portion, a bell-mouth-shaped end portion and an arcuate throat portion interconnecting said diffuser portion and said bell-mouth-shaped portion; said first Venturi element being mounted in said spacer wall with said bell-mouth-shaped portion positioned to project into said first filter element first end cap and said first filter element inner clean air chamber; and
   (d) a pulse-jet cleaning apparatus including a first nozzle oriented to direct a pulse of air into said first Venturi element diffuser portion from said clean air chamber and toward said first filter element.

2. An air filter assembly according to claim 1 wherein:
   (a) said first filter element includes a second end cap having a central air flow aperture therein; and,
   (b) said assembly includes a second filter element having a first end cap with an air flow aperture therein; said second filter element being oriented with said first end cap air flow aperture of said second filter element in air flow communication with said air flow aperture in said first filter element second end.

3. An air filter assembly according to claim 1 wherein:
   (a) said spacer wall includes a second air flow aperture therein;
   (b) said assembly includes a second filter element positioned in air flow communication with said second air flow aperture in said spacer wall; said second filter element including filter media defining a second filter element inner clean air chamber;
   (i) said second filter element being oriented with said second filter inner clean air chamber in air flow communication with said spacer wall second air flow aperture;
   (ii) said second filter element including a first end cap having a central aperture; said filter media of said second filter element being embedded in said first end cap of said second filter element;
   (b) a second Venturi element mounted in said spacer wall; said second Venturi element being positioned in said spacer wall second air flow aperture; said second Venturi element having a diffuser portion, a bell-mouth-shaped end portion and an arcuate throat portion interconnecting said diffuser portion and said bell-mouth-shaped portion; said second Venturi element being mounted in said spacer wall with said bell-mouth-shaped portion positioned to project through said second filter element first end cap central aperture and into said second filter element inner clean air chamber; and
   (c) said pulse-jet cleaning apparatus including a second nozzle oriented to direct a pulse of air into said second Venturi element diffuser portion from said clean air chamber and toward said second filter element.

4. An air filter assembly according to claim 1 wherein:
   (a) said housing includes a lower particulate collection portion; and
   (b) said assembly includes an auger for selective removal of particulates collected in said particulate collection portion of said housing.

5. An air filter assembly according to claim 1 wherein:
(a) said first Venturi element diffuser portion has a truncated conical configuration with a circular open end;
   (i) said first Venturi element diffuser portion open end having a first radius;
   (ii) said first Venturi element being positioned with said diffuser portion open end positioned in said housing clean air chamber; and,
(b) said first Venturi element throat portion has a circular configuration with a second radius;
   (i) a ratio of said first radius to said second radius being within the range of 1.02:1 to 1.3:1.

6. An air filter assembly according to claim 1 wherein:
(a) said first Venturi element diffuser portion has a first length; and,
(b) said first Venturi element has a ratio of said first length to said second radius within the range of 1:1 to 2:1.

7. An air filter assembly according to claim 6 wherein:
(a) said ratio of said first radius to said second radius, and said ratio of said first length to said second radius, are selected to result in a pressure drop across said Venturi element of less than 1 inch of water, when said assembly is operated to filter air at an air flow velocity through said first Venturi throat portion within the range of 1000 to 4000 feet per minute.

8. An air filter assembly according to claim 1 wherein:
(a) said first Venturi element diffuser portion has a truncated conical configuration with a circular open end;
   (i) said first Venturi element diffuser portion open end having a first radius;
   (ii) said first Venturi element being positioned with said diffuser portion open end positioned in said housing clean air chamber;
(b) said first Venturi element throat portion has a circular configuration with a second radius;
   (i) a ratio of said first radius to said second radius being within the range of 1.02:1 to 1.3:1;
(c) said first Venturi element diffuser portion has a first length; and,
(d) said ratio of said first radius to said second radius; and said ratio of said first length to said second radius, are selected to result in a pressure drop across said Venturi element of less than 1 inch of water, when said assembly is operated to filter air at an air flow velocity through said first Venturi throat portion within the range of 1000 to 4000 feet per minute.

9. An assembly according to claim 1 wherein:
(a) said first filter element first end cap extends into said first filter element inner clean air chamber a first distance; and
(b) said first Venturi element bell-mouth-shaped portion extends into said first filter element first end cap central aperture a distance of no greater than said first distance.

10. An assembly according to claim 9 wherein:
(a) said Venturi element comprises a unitary one-piece construction.

11. An assembly according to claim 10 wherein:
(a) said first Venturi element includes a first mounting flange on an exterior surface thereof;
   (i) said first mounting flange projecting substantially perpendicularly to a longitudinal axis of said first Venturi element;
   (ii) said mounting flange being oriented to engage a surface of said spacer wall within said filtering chamber, to secure said first Venturi element thereto.

12. An assembly according to claim 11 wherein:
(a) said assembly includes a first sealing gasket between said spacer wall and said first filter element; said gasket circumscribing said spacer wall first air flow aperture.

13. An air filter assembly according to claim 1 wherein:
(a) said housing includes an upper outer wall having a dirty air inlet therein.

14. An air filter assembly according to claim 13 wherein:
(a) said dirty air inlet is positioned above said first filter element; and,
(b) said assembly includes an inclined baffle positioned between said dirty air inlet and said first filter element.

15. An air filter assembly according to claim 1 wherein:
(a) said first air filter element comprises a cylindrical element.

16. An air filter assembly according to claim 15 wherein:
(1) said cylindrical first filter element comprises a pleated paper filter element.

17. An air filter assembly according to claim 15 wherein:
(a) said first filter element has a longitudinal axis; and,
(b) said first filter element is mounted in said assembly with said filter element longitudinal axis extending at an acute angle, relative to horizontal.

18. An air filter assembly according to claim 17 wherein:
(a) said acute angle is within the range of 15°–30°.

19. An air filter assembly for filtering air with particulate matter therein; said air filter assembly comprising:
(a) a housing including an air inlet and an air outlet; said housing including a rigid spacer wall separating said housing into a filtering chamber and a clean air chamber; said spacer wall including a first air flow aperture therein;
(b) a first filter element positioned in air flow communication with said first air flow aperture in said spacer wall; said filter element including filter media defining a filter element inner clean air chamber;
   (i) said first filter element being oriented with said filter inner clean air chamber in air flow communication with said spacer wall first air flow aperture;
   (ii) said first filter element including a first end cap having a central aperture; said filter media being embedded within said first end cap; and
(c) a first Venturi element mounted in said spacer wall first air flow aperture; said first Venturi element having a diffuser portion, a bell-mouth-shaped end portion and an arcuate throat portion interconnecting said diffuser portion and said bell-mouth-shaped portion; said first Venturi element being mounted in said spacer wall with said bell-mouth-shaped portion positioned to project into said first filter element inner clean air chamber;
   (i) said first Venturi element diffuser portion having an open end with a first radius;
   (ii) said first Venturi element being positioned with said diffuser portion open end positioned in said housing clean air chamber;
   (iii) said Venturi element throat portion has a circular configuration with a second radius;
   (iv) a ratio of said first radius to said second radius being within the range of 1.02:1 to 1.3:1.

20. An air filter assembly according to claim 19 wherein:
(a) said first Venturi element diffuser portion has a first length; and,
(b) said first Venturi element has a ratio of said first length to said second radius within the range of 1:1 to 2:1.

21. An air filter assembly according to claim 20 wherein:

(a) said ratio of said first radius to said second radius, and said ratio of said first length to said second radius, are selected to result in a pressure drop across said Venturi element of less than 1 inch of water, when said assembly is operated to filter air at an air flow velocity through said first Venturi throat portion within the range of 1000 to 4000 feet per minute.

* * * * *

UNITED STATES PATENT AND TRADEMARK OFFICE
CERTIFICATE OF CORRECTION

PATENT NO. : 5,562,746

DATED : October 8, 1996

INVENTOR(S) : Thomas D. Raether

It is certified that error appears in the above-identified patent and that said Letters Patent is hereby corrected as shown below:

In column 3, line 60, insert --tube sheet or--, after the word "panel".

In column 5, line 67, "7" should be --8--.

Signed and Sealed this

First Day of July, 1997

*Attest:*

BRUCE LEHMAN

*Attesting Officer*     *Commissioner of Patents and Trademarks*